United States Patent
Tsai et al.

[11] Patent Number: 5,840,093
[45] Date of Patent: Nov. 24, 1998

[54] METHOD OF CONTROLLING ACCUMULATION OF SODIUM SULFATE ON THE CHECKER PACKING OF A REGENERATOR

[75] Inventors: Yih-Wan Tsai, Pittsburgh; Walter W. Scott, Wexford, both of Pa.

[73] Assignee: PPG Industries, Inc., Pittsburgh, Pa.

[21] Appl. No.: 761,266

[22] Filed: Dec. 6, 1996

[51] Int. Cl.[6] .................................................. C03B 5/237
[52] U.S. Cl. .............................................. 65/27; 65/134.6
[58] Field of Search ...................................... 65/27, 134.6

[56] References Cited

U.S. PATENT DOCUMENTS

| | | | |
|---|---|---|---|
| 3,083,551 | 4/1963 | Pilkington | 65/32 |
| 3,238,030 | 3/1966 | O'Connell et al. | 65/27 |
| 3,240,581 | 3/1966 | O'Connell et al. | 65/27 |
| 3,734,701 | 5/1973 | Pecoraro et al. | 65/27 |
| 3,837,832 | 9/1974 | Pecoraro et al. | 65/182.1 |
| 4,328,020 | 5/1982 | Hughes | 65/27 |
| 4,372,770 | 2/1983 | Krumwiede et al. | 65/27 |
| 5,569,312 | 10/1996 | Quirk et al. | 65/134.6 |
| 5,659,564 | 8/1997 | Elliot | 373/27 |

Primary Examiner—Stanley S. Silverman
Assistant Examiner—Sean Vincent
Attorney, Agent, or Firm—Andrew C. Siminerio

[57] ABSTRACT

The instant invention provides a method of controlling the accumulation of sodium sulfate in the checker packing of a regenerator of a cross-fired regenerative-type glass melting furnace. Typically, glass batch materials are melted within the furnace by combustion of fuel. This combustion produces exhaust gas that is drawn through the regenerator and heats the checker packing. During the melting operation, sodium sulfate gas is formed by the melted glass and is carried with the exhaust gas through the regenerator. The sodium sulfate gas may condense on a portion of the checker packing. As the sodium sulfate condensate accumulates on the checker packing, it may restrict the flow of exhaust gas and/or combustion air through the regenerator. In the instant invention, a section of the regenerator which includes the portion of the checker packing with the condensed sodium sulfate is selectively heated to a temperature sufficient to melt the sodium sulfate, while any additional heating of remaining sections of the regenerator is minimized. In one embodiment of the invention, fuel is injected into a portion of the exhaust gas that passes through the section of the regenerator where the sodium sulfate condensate has accumulated. The fuel burns with the portion of the exhaust gas and heats the portion of the checker packing with the sodium sulfate build-up to melt the sodium sulfate.

19 Claims, 2 Drawing Sheets

METHOD OF CONTROLLING ACCUMULATION OF SODIUM SULFATE ON THE CHECKER PACKING OF A REGENERATOR

BACKGROUND OF THE INVENTION

1. Field of the Invention

This invention relates to the production of flat glass by the float process and in particular, to a method of controlling the accumulation of sodium sulfate on the checker packing of a regenerator used in the glass melting process.

2. Technical Considerations

The production of high-quality flat glass by the float process, such as that disclosed in U.S. Pat. No. 3,083,551, is practiced on a large scale. Typically, the glass is melted using a well-known cross-fired regenerative-type furnace where fuel-fired burners direct flames across molten glass and the exhaust gas from the flames is removed through regenerators positioned along opposite sides of the melting furnace. The exhaust gas passes through these regenerators transferring its heat to the checker packing within the regenerator. The checker packing is generally constructed from refractory brick. The heated packing is used to preheat combustion air which is combined with fuel used to produce the flames during the firing cycle of the heating operation.

As the flames flow across the molten glass and the exhaust gas exits the melting furnace, sodium sulfate gas generated by the melting of the glass batch materials is drawn with the exhaust gas into the regenerator structure. The exhaust gas may also include dust from unmelted portions of the batch material that is picked up during the firing cycle of the glass batch melting process. The sodium sulfate gas, with or without the carryover particulate, begins to condense on the refractory brick of the checker packing that has a temperature of about 1600° F. (871° C.) or less, forming molten and/or solid sodium sulfate. As the condensed sodium sulfate accumulates on the checker packing, plugging may occur in isolated portions of the regenerator. If the plugging covers a large region of the regenerator, the melting furnace pressure control may become a problem. In particular, the plugging will restrict the gas flow through the regenerator, i.e. it will restrict the flow of the exhaust gas as it passes down through the regenerator to remove heat from the exhaust gas during its exhaust cycle and/or the flow of the air for combustion as it passes upwardly through the regenerator and is preheated during its firing cycle.

One possible method of dealing with this problem is to lengthen the firing and exhaust cycles of the glass melting operation to heat the regenerator packing to a higher temperature so as to melt the condensed sodium sulfate and unplug the regenerator. However, this procedure heats the entire regenerator structure when the problem may be confined to only a small portion of the packing. In addition, care must be taken not to overheat the packing or any structures used to support the regenerator, which may reduce the useful life of the regenerator.

It would be advantageous to provide an arrangement whereby plugged sections of a regenerator may be selectively cleared without heating up the entire regenerator structure.

SUMMARY OF THE INVENTION

The instant invention provides a method of controlling the accumulation of sodium sulfate in the checker packing of a regenerator of a cross-fired regenerative-type glass melting furnace. Typically, glass batch materials are melted within the furnace by combustion of fuel. This combustion produces exhaust gas that is drawn through the regenerator and heats the checker packing. During the melting operation, sodium sulfate gas is formed by the melted glass and is carried with the exhaust gas through the regenerator. The sodium sulfate gas may condense on a portion of the checker packing. As the sodium sulfate condensate accumulates on the checker packing, it may restrict the flow of exhaust gas and/or combustion air through the regenerator. In the instant invention, a section of the regenerator which includes the portion of the checker packing with the condensed sodium sulfate is selectively heated to a temperature sufficient to melt the sodium sulfate while any additional heating of remaining sections of the regenerator is minimized. In one embodiment of the invention, fuel is injected into a portion of the exhaust gas that passes through the section of the regenerator where the sodium sulfate condensate has accumulated. The fuel burns with the portion of the exhaust gas and heats the portion of the checker packing with the sodium sulfate build-up to melt the sodium sulfate.

DETAILED DESCRIPTION OF THE INVENTION

The invention as described herein is illustrated in connection with a typical cross-fired regenerative-type glass melting furnace with an open regenerator structure. However, the principles of the present invention may be applied to any type of glass melting furnace in which the same or similar conditions and problems are encountered. For example, the present invention may be used in combination with a partitioned regenerator, wherein the checker packing is divided into individual sections or compartments that are isolated from each other.

Figure 1:
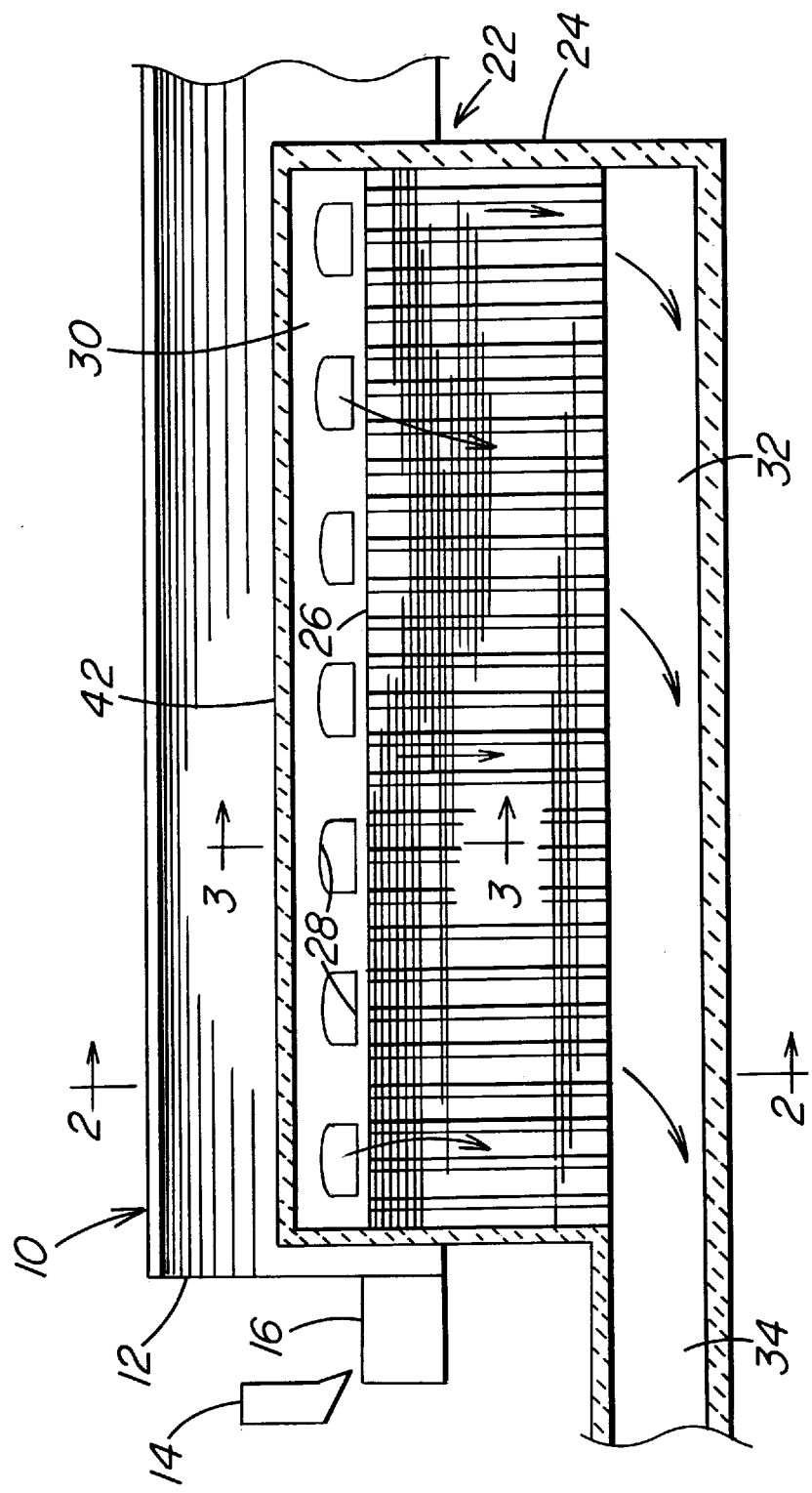
FIG. 1 is a side view of a cross-fired regenerative-type glass melting furnace along a longitudinal cross-section through the regenerator.
Figure 2:
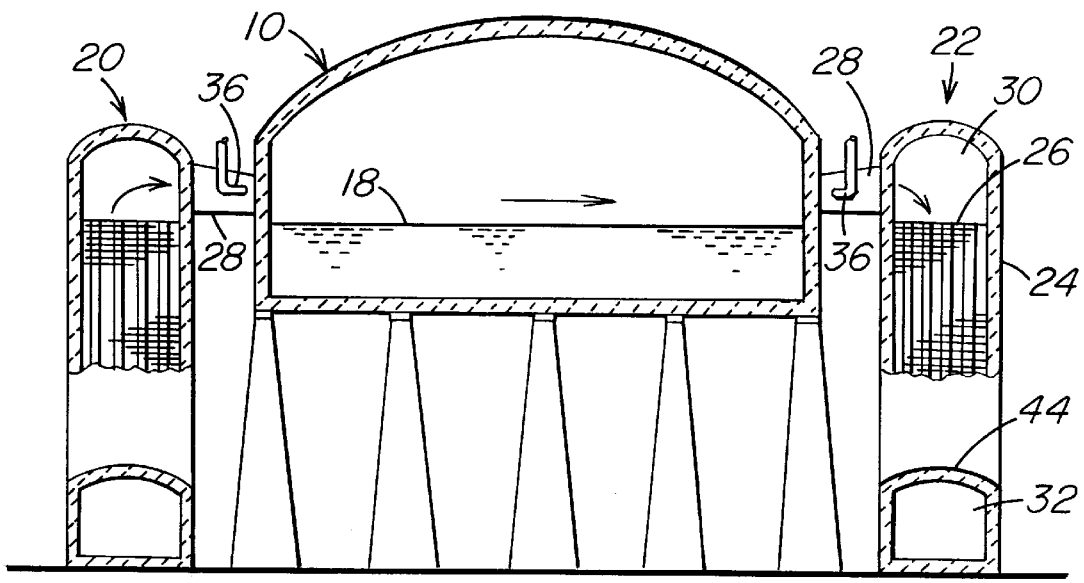
FIG. 2 is a cross-sectional view taken along line 2—2 of FIG. 1.
Figure 3:
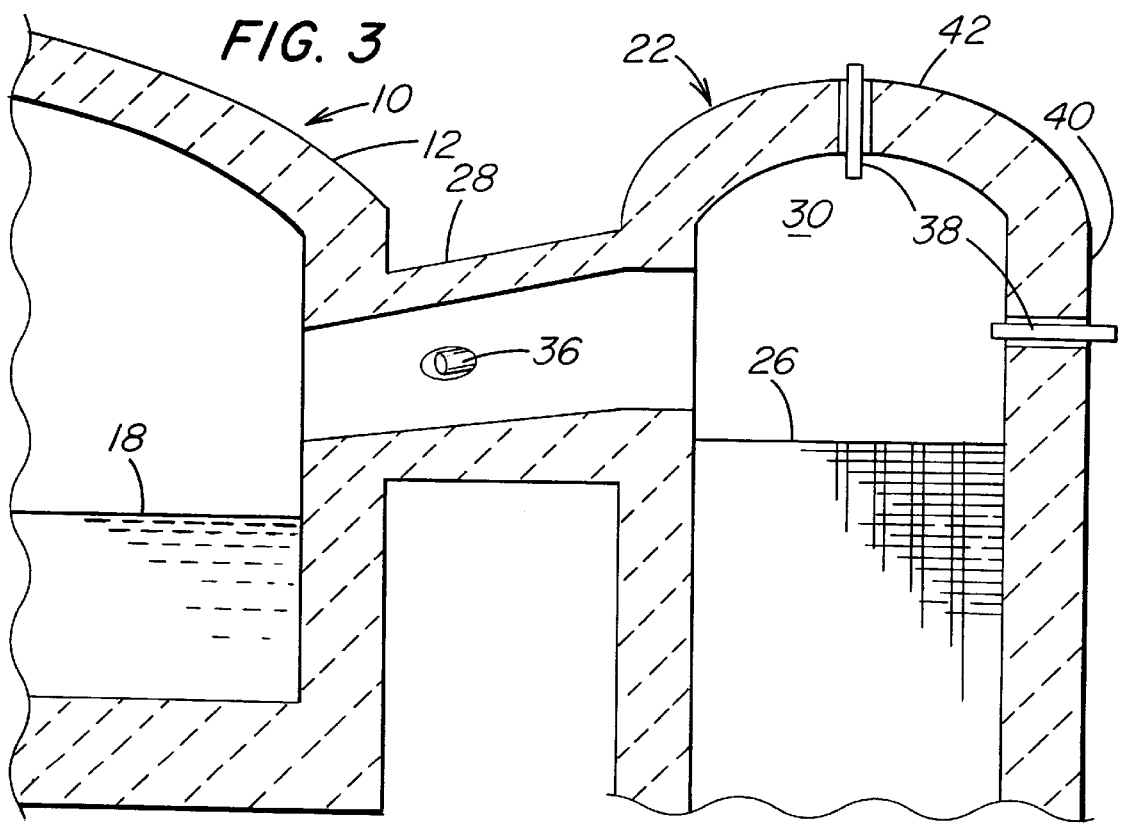
FIG. 3 is an enlarged cross-sectional view similar to that shown in FIG. 2 of an upper portion of the regenerator.

FIGS. 1 and 2 depict a conventional cross-fired regenerative-type glass melting furnace 10 commonly used in the production of flat glass. The furnace 10 includes a melting chamber 12 into which raw glass-making ingredients are fed from a hopper 14 into an inlet extension 16 of the furnace. The glass batch materials are deposited onto a pool of molten glass 18 maintained within the melting chamber 12. Melting chamber 12 is flanked by a pair of primary regenerators 20 and 22 of like construction. Each regenerator includes a refractory housing 24 containing a checker packing 26 constructed from refractory brick, permitting the alternate passage of air and exhaust gas through the regenerator. The regenerators 20 and 22 communicate with the melting chamber 12 by means of a plurality of ports 28 spaced along both sides of the melting chamber 12. Each port 28 opens at one end of the interior of the melting chamber 12 and at the other end to a plenum 30 above the packing 26 of the respective regenerators 20 and 22. Below the packing 26 in each regenerator is a distributing space 32 which communicates at one end with a flue 34 which may lead to additional exhaust gas processing equipment, for example, a secondary regenerator (not shown) and/or an $NO_x$ reduction system (not shown) as disclosed in U.S. Pat. No. 4,372,770.

Flows of combustion air or exhaust gas through the furnace 10 and regenerators 20 and 22 are periodically reversed (generally about every 10 to 15 minutes) and each regenerator has corresponding alternating firing and exhaust cycles. In the mode of operation depicted in the drawings, the gas flows from left to right as viewed in FIG. 2, wherein incoming combustion air flows upwardly through the left-hand generator 20 (firing cycle for regenerator 20) and exhaust gas exits from the melting chamber 12 and flows downwardly through the right-hand regenerator 22 (exhaust cycle for regenerator 22). The incoming combustion air is preheated by the regenerator packing 26 on left side and fuel (e.g. natural gas or oil) is mixed with the preheated air by means of nozzles 36 in the left-hand ports 28 and the resulting flames extend from left to right over the molten glass 18 within the melting chamber 12. During this phase of the melting operation, the burner nozzles 36 in the right-hand port remain inactive. The exhaust gases leave the melting chamber 12 through the right-hand ports 28 and pass downwardly through the primary regenerator 22 where heat from the exhaust gas is transferred to the checker packing 26. Since heat from the exhaust gas is transferred to the packing 26 as the gas passes from plenum 30 through the regenerator and into the distribution space 32, generally more heat will be transferred to the upper portions of the checker packing 26 than the lower portions so that the temperature of the upper portions will be progressively greater than the temperature of the lower portions as the temperature is measured from distribution space 32 upward to plenum 30. After a predetermined amount of time, the firing within the melting chamber 12 is reversed. More specifically, the burners 36 on the left side of the furnace 10 are turned off and the burners 36 on the right side are turn on and incoming combustion air passes upwardly through the right-hand regenerator 22 (firing cycle for regenerator 22) and the exhaust gas leaves the melting chamber 12 by way of the left-hand regenerator 20 (exhaust cycle for regenerator 20). The length of the firing cycle is generally dictated by fuel efficiency.

The temperature of the refractory brick within the checker packing 26 at the end of each cycle will depend of the length of the firing/exhaust cycle for the particular melting operation. It should be appreciated that the checker packing 26 in the regenerator is not uniformly heated. As discussed earlier, there will be a decreasing temperature gradient from top to bottom within the regenerator. In addition, not all the burners 36 along one side of the furnace 10 will be burning at the same rate. As a result, some portions of the checker packing 26 will be cooler than others.

During the glass batch melting operation, sodium sulfate gas is generated by the batch material and collects within the melting chamber 12. As the exhaust gas exits the melting chamber 12 and into one of the two regenerators through ports 28, sodium sulfate gas, with or without carryover particulate, is drawn with the exhaust gas into the checker packing 26. As the exhaust gas passes through portions of the checker packing 26 which has a temperature of less than about 1600° F. (871° C.), it condenses on the refractory brick. As the molten and solid sodium sulfate accumulates within the checker packing 26, the packing may become plugged resulting in the restriction of combustion air and exhaust gas flow through the regenerator.

The present invention avoids the problem of raising the temperature of the entire regenerator to a level sufficient to melt the sodium sulfate by providing for selective heating of the plugged portions of the regenerator to raise the temperature of that selected portion while minimizing any increase in temperature in the remaining portions of the regenerator. This is accomplished by selectively injecting fuel into the upper plenum 30 of the regenerator during its exhaust cycle only above those locations where plugging has become a problem. Since there is generally excess air in the exhaust gas, the injected fuel will ignite and be sucked into the checker packing 26, burning around plugged region and increasing its temperature so as to melt the plugging material in a localized area within the regenerator. To this end, a plurality of fuel injection nozzles 38 may be positioned in the target wall 40 or roof 42 along the length of the regenerator to inject fuel into the plenum space 30 which will mix with the hot exhaust gas and burn as the exhaust gas and fuel is drawn through the packing 26. With the exhaust gas entering the upper plenum 30 at temperatures of about 2600° to 3100° F. (1427° to 1704° C.), the injection of fuel into a portion of the exhaust gas will further elevate the exhaust gas temperature in a localized area of the regenerator to further heat the checker packing 26 within a localized area to a temperature of at least about 1600° F. (871° C.) to melt the sodium sulfate restricting the exhaust gas and air flow through the checker packing 26. As the sodium sulfate melts, it will drip from the checker packing 26 and eventually fall on the floor of the distribution space 32. As discussed earlier, since the fuel is injected into that portion of the exhaust gas that will flow through the plugged section of the regenerator, the increased heating is limited to only that section of the regenerator which includes the plugged portion. The amount of fuel and duration of the fuel injection must be controlled to ensure that the condensed sodium sulfate is melted and removed from the plugged checker packing 26 while not overheating any critical support structure of the regenerator, and in particular to the support arch 44 which supports the regenerator checker packing 26.

The type of fuel injected into the upper plenum 30 of the regenerator is typically a combustible hydrocarbon, for example, methane, propane, natural gas, etc. If desired, the amount of fuel used may be further influenced by the desire to reduce $NO_x$ emissions in the exhaust gas. In particular, the amount of fuel used may be near the amount stoichiometrically required to consume excess oxygen in the exhaust gas, thus reducing the amount of oxygen available to form $NO_x$ emissions.

Although not limiting in the present invention, it is expected that injection of 2000 to 15,000 SCFH of fuel into selected portions of the regenerator over an extended period of time during the exhaust cycle should be sufficient to both maintain control over the temperature within the regenerator and melt the sodium sulfate condensate to eliminate any localized plugging. The actual amount of fuel and the injection period will depend on the amount of plugging, the temperatures within the regenerator and the types, amount and arrangement of the materials used to construct the regenerator.

It should be appreciated that rather than using a plurality of nozzles spaced along the upper plenum 30, the plenum 30 may be provided with a plurality of openings through which a fuel injection nozzle may be inserted to combine with exhaust gas at selected portions along the regenerator to selectively raise the temperature of selected portions of the regenerator and remove any sodium sulfate plugging. In addition, if desired the fuel may be injected into the port 28 as the exhaust gas passes through the port and into the upper plenum 30 of the regenerator.

In addition, it is believed that rather than injecting the fuel into the upper plenum 30 of the regenerator, the fuel may be injected directly into the plugged area of the checker packing 26 using a fuel lance (not shown) or some other similar type of injector.

The present invention provides a more efficient use of fuel to correct plugging problems in the regenerator. More specifically, the fuel is only used at those locations where there is a plugging problem and only for a sufficient time required to correct the problem. As a result, the firing operation may continue in an uninterrupted and unmodified manner, thus simplifying the overall melting operation.

In one particular embodiment of the invention, the furnace 10 produced an exhaust gas flow of approximately 2.15 million SCFH through seven ports. Natural gas was injected through the target wall 40 at one selected location along the upper plenum 30 above a plugged section at a rate of approximately 7000 SCFH during each exhaust cycle for the regenerator over a 24-hour period to further heat a plugged portion of the regenerator without heating the entire regenerator structure.

The principles employed in the present invention may also be used to unplug secondary regenerators used in the melting operation by injecting fuel during the exhaust cycle into selected portions of the secondary regenerators.

As discussed earlier, it is important to control the temperature within the regenerator to ensure that the support arch 44 not be overheated during the localized injection of fuel and subsequent melting of the sodium sulfate condensate. For the arrangement discussed above, the arch 44 was constructed of fire clay refractory. With such a material, it is preferred that the temperature of the arch 44 not exceed 2000° F. (1093° C.). However, it should be appreciated that with other materials, the maximum permissible temperature of the arch 44 may vary.

The forms of the invention shown and described in this disclosure represent the preferred embodiment and it is understood that various changes may be made without departing from the scope of the invention as defined in the following claims.

We claim:

1. A method of controlling build-up of sodium sulfate in the checker structure of a regenerator of a cross-fired regenerative-type glass melting furnace, wherein glass batch materials are melted within said furnace by combustion of fuel which produces exhaust gas that is drawn through said regenerator and heats said checker packing, and wherein sodium sulfate gas from said melted glass is carried with said exhaust gas through said regenerator and said sodium sulfate gas condenses and accumulates within said regenerator on a portion of said checker packing, restricting gas flow through said portion of said checker packing, comprising;

selectively heating a section within said regenerator which includes said portion of said checker packing to a temperature sufficient to melt said sodium sulfate, while minimizing any additional heating of remaining sections within said regenerator.

2. The method as in claim 1 wherein a portion of said exhaust gas passes through said section of said regenerator and said heating step includes the step of injecting fuel into said portion of said exhaust gas, wherein said fuel burns with said portion of said exhaust gas and heats said portion of said checker packing as said portion of said exhaust gas passes through said section of said regenerator.

3. The method as in claim 2 wherein said temperature of said portion of said checker packing is increased during said heating step to at least about 1600° F.

4. The method as in claim 3 further providing a support structure for said checker packing and further including the step of controlling said heating of said section of said regenerator to prevent overheating of said support structure.

5. The method as in claim 4 wherein said controlling step includes the step of maintaining said support structure at a temperature of less than about 2000° F.

6. The method as in claim 3 wherein said injecting step includes the step of injecting about 2,000 to 15,000 SCFH of fuel.

7. The method as in claim 3 wherein said injecting step includes the step of injecting an amount of fuel sufficient to consume excess oxygen in said exhaust gas.

8. The method as in claim 3 wherein said exhaust gas is drawn downwardly through said regenerator and said injecting step includes the step of combining said fuel with said portion of said exhaust gas at an upper end of said regenerator above said portion of said checker packing.

9. The method as in claim 8 wherein said exhaust gas passes through a plenum positioned above said regenerator prior to being drawn downward through said regenerator and said combining step includes the step of combining said fuel with said portion of said exhaust gas within said plenum.

10. The method as in claim 3 further including the step of inserting a nozzle into said portion of said checker packing and said injecting step includes the step of injecting fuel directly into said portion of said checker packing while said portion of said exhaust gas passes through said section of said regenerator.

11. In a method of melting glass including the steps of feeding glass batch materials into a melting furnace, melting said batch materials within said furnace by combustion of fuel which produces exhaust gas, wherein said melting of said batch materials produces sodium sulfate gas which mixes with said exhaust gas, passing said exhaust gas from said furnace through a regenerator, transferring heat from said exhaust gas to packing within the regenerator, wherein said sulfate gas condenses and accumulates on selected sections of said packing within said regenerator which have a temperature of less than about 1600° F. restricting passage of gas through said regenerator, the improvement comprising:

increasing said temperature of said selected sections of said regenerator to greater than about 1600° F. to melt said sodium sulfate which has condensed on said packing within said regenerator, while minimizing any change in temperature within remaining sections of said regenerator.

12. The method as in claim 11 wherein portions of said exhaust gas pass through said selected sections of said regenerator and said increasing step includes the step of injecting fuel into said portions of said exhaust gas, wherein said fuel burns with said portions of said exhaust gas and increases said temperature of said selected sections of said regenerator as said portions of said exhaust gas pass through said selected sections of said regenerator.

13. The method as in claim 12 further providing a support structure for said packing and further including the step of controlling said temperature within said selected sections of said regenerator to prevent overheating of said support structure.

14. The method as in claim 13 wherein said controlling step includes the step of maintaining said support structure at a temperature of less than about 2000° F.

15. The method as in claim 12 wherein said injecting step includes the step of injecting about 2,000 to 15,000 SCFH of fuel.

16. The method as in claim 12 wherein said injecting step includes the step of injecting an amount of fuel sufficient to consume excess oxygen in said exhaust gas.

17. The method as in claim 12 wherein said exhaust gas is drawn downwardly through said regenerator and said injecting step includes the step of combining said fuel with said portions of said exhaust gas at an upper end of said regenerator above said selected sections of said regenerator.

18. The method as in claim 17 wherein said exhaust gas passes through a plenum positioned above said regenerator prior to being drawn downward through said regenerator and said combining step includes the step of combining said fuel with said portions of said exhaust gas within said plenum.

19. The method as in claim 12 further including the step of inserting nozzles into said selected sections of said regenerator and injecting fuel into said selected sections of said regenerator while said portions of said exhaust gas pass through said selected sections of said regenerator.

* * * * *